(12) United States Patent  
Tomlin et al.

(10) Patent No.: US 7,089,252 B2
(45) Date of Patent: Aug. 8, 2006

(54) SYSTEM AND METHOD FOR RAPID COMPUTATION OF PAGERANK

(75) Inventors: John Anthony Tomlin, Sunnyvale, CA (US); Andrew S. Tomkins, San Jose, CA (US); Arvind Arasu, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 10/132,047

(22) Filed: Apr. 25, 2002

(65) Prior Publication Data

US 2003/0204502 A1   Oct. 30, 2003

(51) Int. Cl.
    *G06F 17/00* (2006.01)
(52) U.S. Cl. ....................................... 707/101
(58) Field of Classification Search ............. 707/1, 707/100, 101, 102, 104.1
    See application file for complete search history.

(56) References Cited

U.S. PATENT DOCUMENTS

| | | | |
|---|---|---|---|
| 6,285,999 B1 | 9/2001 | Page | 707/5 |
| 6,560,600 B1* | 5/2003 | Broder | 707/7 |
| 6,571,229 B1* | 5/2003 | Campbell | 706/20 |
| 6,792,419 B1* | 9/2004 | Raghavan | 707/3 |

2003/0050909 A1*  3/2003  Preda et al. ................... 707/1

OTHER PUBLICATIONS

Borodin et al "Finding Authorities and Hubs from Structures on the World Wide Web", ACM May 1-5, 2001, pp. 415-429.*

* cited by examiner

Primary Examiner—Uyen Le
(74) Attorney, Agent, or Firm—Geza C. Ziegler, Jr.; Leonard T. Guzman

(57) ABSTRACT

A method of ranking a plurality of linked documents. The method comprises obtaining a plurality of documents, and determining a rank of each document. The rank of each document is generally a function of a rank of all other documents in the plurality of documents which point to the document and is determined by solving, by equation-solving methods (including Gauss-Seidel iteration and partitioning) of a set of equations wherein:

$$x_i = (1-\alpha) + \alpha \sum_j a_{ij} x_j,$$

where $x_i$ is the rank of the page indexed by i, $\alpha$ is a number strictly between 0 and 1.0, the summation is over all indices j such that page j points to page i, and $a_{ij}$ is defined to be the reciprocal of the number of links pointing out from page j (denoted $d_j$) if page j points to page i, and zero otherwise.

4 Claims, 7 Drawing Sheets

SYSTEM AND METHOD FOR RAPID COMPUTATION OF PAGERANK

BACKGROUND OF THE INVENTION

1. Field of the Invention

The present invention generally relates to the analysis of data on the worldwide web (Internet) and in particular to a web-scale analysis of structured data.

2. Brief Description of Related Developments

The explosive growth of the web, and the difficulty of performing complex data analysis tasks on unstructured data, has led to interest in providing relational views of certain types of web-wide information. A number of approaches have emerged for specifying these relational views, and addressing the resulting performance questions.

The most direct line of research focuses on applying traditional relational approaches to the web, by defining a set of useful relations, such as the HTML "points to" relation, and allowing users to define queries over these relations using a structured query language. These approaches provide a great deal of power and generality, but at a cost in efficiency, for two reasons. First, the particular algorithms of interest in this domain may have efficient special-purpose solutions that even the most sophisticated query optimizers cannot hope to recognize. Second, the general set of neighborhood-type queries that can be phrased using the HTML "points to" relation in particular represent a large set of graph-theoretic problems that can in general be intractable. However, the relation is not arbitrary—the underlying structure of the web graph contains a number of regularities that can be exploited by particular algorithms, but are not apparent to a generic engine that treats "points to" as an arbitrary binary relation.

Thus, a second line of research focuses on solving particular web-scale analysis problems without invoking the machinery of a generic query language. Such approaches are numerous. To date, one of the most successful instances of this line of research focuses specifically on the "points to" relation on web pages. All of these examples can be implemented as sequences of "joins across relations" derived from "points-to," but all give more efficient specific algorithms drawn from graph theory or numerical computation.

PageRank™ is a static ranking of web pages initially presented in, and used as the core of the Google™ search engine (http://www.google.com). It is the most visible link-based analysis scheme, and its success has caused virtually every popular search engine to incorporate link-based components into their ranking functions.

The convergence rate of the traditional iterative approach to PageRank™ computation, for various parameters is slow enough to cast doubt on this well-established technique. After performing a fairly significant number of iterations of this computationally intensive operation, the average error per page is roughly 50% of the value of that page. The reason for the slow convergence yields a characterization of the repetitive small-scale structure in the web graph. Web sites have connectivity properties with other web sites that allow fast convergence of PageRank™-style algorithms, and the network of linkages between sites is in some sense optimized for effective browsing. On the other hand, the structure within individual web sites is limiting from the perspective of PageRank™, as well as from the perspective of an individual attempting to browse and discover the pages on the site.

SUMMARY OF THE INVENTION

The present invention is directed to ranking a plurality of linked documents. In one embodiment, the method comprises obtaining a plurality of documents, and determining a rank of each document. The rank of each document is generally a function of a rank of all other documents in the plurality of documents which point to the document and is determined by a solution comprised of a set of equations wherein $X_i = (1-\alpha) + \alpha \Sigma_j a_{ij} x_j$, where $x_i$ is the rank of the page indexed by i, $\alpha$ is a number strictly between 0 and 1.0, the summation is over all indices j such that page j points to page i, and $a_{ij}$ is defined to be the reciprocal of the number of links pointing out from page j (denoted $d_j$) if page j points to page i, and zero otherwise.

In one aspect, the present invention is directed to a method for determining a ranking of each page in a network of linked pages where some pages are linked to other pages and at least some pages are linking pages or a combination thereof. In one embodiment, the method comprises obtaining a plurality of pages from a web based structure comprising a plurality of input segments I with input nodes P, a plurality of output segments O with output nodes Q, a plurality of strongly connected segments S connected to both the input segments and output segments, and nodes T interconnecting the input and output segments. A matrix structure is formed, the matrix being defined by:

$$A = \begin{pmatrix} P & & & & A_{PI} \\ O & A_{OS} & A_{OT} & & A_{OQ} \\ & S & & A_{SI} & \\ & & T & A_{TI} & \\ & & & I & \\ & & & & Q \end{pmatrix}$$

The matrix is partitioned in order to solve for the rank via a sequence of smaller systems of equations.

In another aspect, the present invention is directed to a computer program product. In one embodiment the computer program product comprises a computer useable medium having computer readable code means embodied therein for causing a computer to calculate a static ranking of web pages with a matrix equation. The computer readable code means in the computer program product comprises a computer useable medium having computer readable code means embodied therein for causing a computer to solve for a rank by an iterative solution of equations defined by $\chi = (1-\alpha)e + \alpha A \chi$.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT(S)

Figure 1:
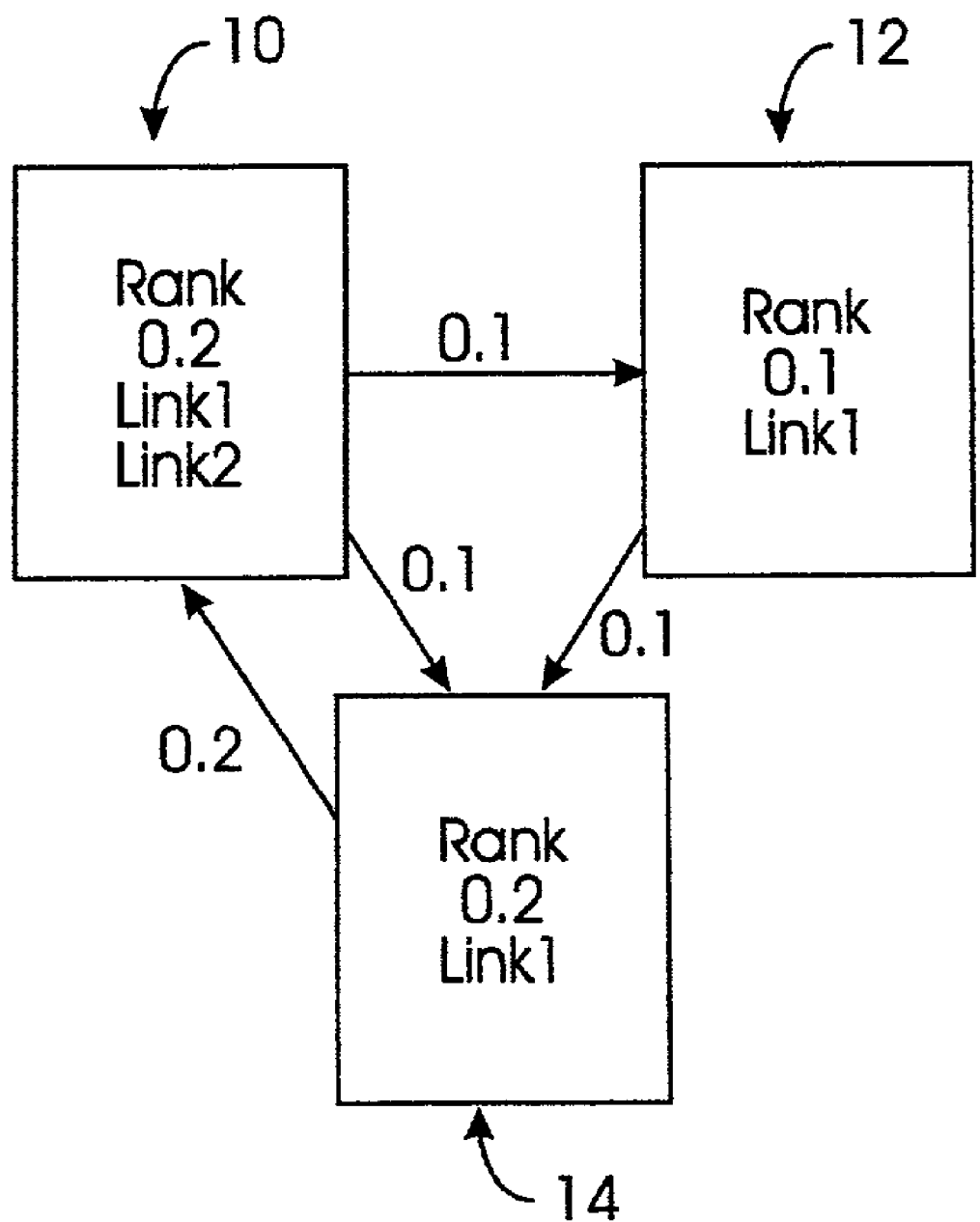
FIG. 1 is a block diagram of one embodiment of a linked database including three documents and illustrating a rank associated with each document as determined in accordance with features of the present invention.

The present invention is generally directed to computing iterative linear functions on the web. As a driving example, we focus our attention on PageRank™, and the related problem of the convergence of random walks on the web graph.

While such problems have been addressed at near web-scale using Structured Query Language ("SQL") the present invention makes significant use of the specialized nature of the computation, applying various algorithms from numerical computation of eigenvectors. At the same time the present invention makes significant use of web structure.

The HTML "points-to" relation on web pages can be treated as a directed graph, and represented by two sets: G=(V,E). The set V of vertices consists of n pages, and the set E of edges consists of the directed hyperlinks between pages. The directed edge (i,j) exists if and only if page i, for example the web page 10 of FIG. 1 has a hyperlink to page j (web page 12 of FIG. 1). For convenience, we define $d_i$ as the out-degree of page i; that is, the number of hyperlinks on page i. We also define a strongly connected component of G to be a subset $V^1 \subset V$ of the vertices such that for all pairs of pages i,j$\in V^1$, there exists a directed path from i to j in $(V^1,E)$. Intuitively, a strongly connected component is a set of pages each of which can reach all the rest, by following hyperlinks, without visiting pages outside the set. Finally, we will refer to a largest strongly connected component of a graph as SCC. For example, referring to FIG. 1, an example of a linked database including three linked documents is shown. Document 10 points to both documents 12 and 14.

For any n×n matrix M, the scalars λ and vectors χ satisfying Mχ=λχ are called the (right) eigenvalues and eigenvectors respectively of M. There may be up to n distinct eigenvalues (and corresponding eigenvectors). Left eigenvalues μ and eigenvectors ν may analogously be defined, satisfying $\mu v^T = v^T M$. We write $v^T$ instead of v to imply that we consider a row vector, for convenience.

A principal eigenvalue of a matrix is an eigenvalue whose magnitude is maximal over all eigenvalues; a principal eigenvector is an eigenvector corresponding to a principal eigenvalue.

A Markov chain is simply a set of states and a set of transition probabilities-from any state, there is a probability distribution describing which state the chain will visit next.

An n×n matrix M is (row) stochastic if all entries are non-negative and the entries of each row sum to 1. Such a matrix can be thought of as an n-state Markov chain in which $m_{ij}$ is the probability of transitioning to state j when the chain is in state i. The condition that all entries be non-negative is simply the requirement that probabilities be non-negative. The condition that each row sum to 1 is simply a rephrasing of the requirement that from any particular state of the Markov chain, the next state must be described as a probability distribution. Let the current state of the Markov chain be given by some vector $v^T$ with non-negative entries summing to 1. The $i^{th}$ entry of this vector is therefore the probability that the Markov chain is currently in state i. Then the next state of the chain can be computed from the current state $v^T$ as $v^T M$.

If the Markov chain is in a steady state then taking another step does not change the state; that is, $v^T = v^T M$. We see that the vector $v^T$ is a (left) eigenvector of M corresponding to the eigenvalue 1. Stochastic matrices always have a maximal (principal) eigenvalue 1; therefore, the steady state of a Markov chain corresponding to a stochastic matrix M is simply the principal (left) eigenvector of M.

The simplest implementation of a static ranking scheme for web search is the following. All pages to be indexed are ordered from "best to worst." This ordering is the "static ranking" itself. When a query arrives, and some fixed number of pages (for example 10) must be returned, the index returns the "best" 10 pages that satisfy the query, where best is determined by the static ranking. This simple scheme allows highly efficient index structures to be built. The scheme can then be augmented by incorporating other parameters.

The general approach to PageRank™ computation comprises defining a matrix P such that:

$$P_{ij} = \begin{cases} d_i^{-1} & \text{if } (i,j) \in E \\ 0 & \text{otherwise} \end{cases} \quad i,j = 1, \ldots, n$$

Some descriptions allow for multiple links between i and j by defining $P_{ij} = n_j/d_i$ where $n_j$ is the number of links from i to j. We make the simplifying, but non-essential, assumption that such multiple links are coalesced, and that all $n_j=1$.

Assuming an imaginary web surfer visiting a particular page follows each link on the page with equal probability, then the matrix P corresponds to a Markov chain model of the motion of this surfer through the web graph. This follows since $P_{ij}$ then represents the transition probability that the surfer in state i (at page i) will move to state j (page j). If we let $\chi_i$ be the probability that the surfer is in state i then by elementary theory for any initial vector χ representing a distribution over possible locations of the surfer:

$$\chi^T P^k \to v^T \text{ as } k \to \infty$$

where v is the vector of probabilities representing the steady state of the system, with $v^T = v^T P$.

The matrix P is said to be reducible if the surfer can get "trapped" in one section of the web; or more formally, if P can be permuted to the form:

$$\begin{pmatrix} P_{11} & 0 \\ P_{21} & P_{22} \end{pmatrix} \quad (1)$$

where the upper right partition is all zeros. It is easy to see that the values of $v_i$ corresponding to the partition $P_{22}$ are all zero, and so the surfer will get "trapped" in $P_{11}$. Particular and frequent examples of this phenomenon on the web are pages with zero out-degree, in which case we have $p_{ii}=1$ (and $p_{ij}=0$ for i≠j). In Markov chain terminology, these are absorbing states.

Considering the "ideal" definition of PageRank™, that is page i has rank $\chi_i$ as a function of the rank of the pages which point to it as shown for example in FIG. 1, then:

$$\chi_i = \sum_{(j,i) \in E'} d_j^{-1} \chi_j \quad (2)$$

where the set of edges E' is the set E with any self loops removed, and the out-degrees $d_j$ modified if necessary to account for this. This definition is often interpreted to mean that the "importance" of a page depends on the importance of pages pointing to it.

This recursive definition gives each page a fraction of the rank of each page pointing to it, inversely weighted by the number of links out of that page. The number of links pointing out from a page can also be referred to as "outlinks." The number of outlinks from page j can be denoted as $d_j$. We may write this in matrix form as:

$$\chi = A\chi \quad (3)$$

or $$\chi = BD^{-1}\chi \quad (4)$$

where $D = \text{diag}(d_1, \ldots, d_n)$ and B is a zero-one matrix with entries:

$$b_{ij} = \begin{cases} 1 & \text{if } (i,j) \in E' \\ 0 & \text{otherwise} \end{cases} \quad i, j = 1, \ldots, n \quad (5)$$

Note that $A = BD^{-1}$ is the transpose of the transition probability matrix P. At this point, we also note that P excludes any self-loops in the web graph (other than those of absorbing states) from any kind of page ranking calculation, as they confer spurious PageRank™.

We now have three very closely related, but distinct representations of the web:

The directed web graph G=(V,E);

The transition matrix P; and

The coefficient matrix A of the equations defining the ideal PageRank™ computation.

All three of these representations are useful in discussing PageRank calculations, but it is also important to keep them distinct-in particular to remember that the coefficient matrix A is the transpose of P, not P itself, while self-loops, and perhaps other forms of "spam" in G are ignored.

Now, let us look at the ideal model as represented by equation (3). The PageRank™ vector $\chi$ is clearly the principal eigenvector corresponding to the principal eigenvalue (with value 1) if this is nonzero. Unfortunately, the real structure of the web, with many pages having zero in-degree (and others with zero out-degree) means that the transition matrix will have the structure represented by equation (1)—in fact will be even more highly reducible—and hence the cofficient matrix A will have the structure:

$$\begin{pmatrix} A_{11} & A_{12} \\ 0 & A_{22} \end{pmatrix} \quad (6)$$

and the eigenvector corresponding to the principal eigenvalue 1 will contain a great many zeros.

To get around this difficulty, an "actual PageRank™ model" has been described as:

$$\chi_i = (1-\alpha) + \alpha \sum_{(j,i) \in E'} d_j^{-1} \chi_j \forall i \quad (7)$$

or in matrix terms:

$$\chi = (1-\alpha)e + \alpha A\chi \quad (8)$$

where e is the vector of all 1's, $e^T\chi = n$, and $\alpha (0 < \alpha < 1)$ is a parameter. Unless stated otherwise we use a value of 0.9 for $\alpha$. This modification clearly overcomes the problem of identically zero PageRank™. We may think of equation (7) as "seeding" each page with a rank of $(1-\alpha)$.

We can then proceed to obtain an analogous eigenvalue problem again, as follows. Supposing that in addition to following links out of a page with probability $p_{ij}$ a surfer makes a "random jump" every so often to some other page with uniform probability 1/n. Suppose the surfer follows some link with probability $\alpha$ and makes the random jump with probability $(1-\alpha)$. For convenience, we define $M = (1-\alpha)E/n + \alpha A$ where E is $ee^T$, the matrix of all 1's. Then the modified transition probabilities are given by M, and the actual PageRank™ calculation becomes in matrix form:

$$\chi = M\chi \quad (9)$$

With minor variations (e.g. excluding a random jump from a page to itself), this seems to be the standard model. It can be solved by application of a Power Iteration method incorporating features of the present invention.

It is easy to show that solving equations (8) and (9) are equivalent. If we scale the eigenvector obtained from equation (9) so that $e^T\chi = n$ we immediately obtain equation (8). Conversely, taking any solution $\chi$ of equation (8) and noting that $e^T A = e^T$, we see that $e^T\chi = n$ and equation (9) follows.

Two observations are appropriate here. Firstly, much of the reformulation is necessary because of special small-scale structure in the web graph—zero in-degree and out-degree nodes in particular. Secondly, although we can preserve actual PageRank™ computation as an eigenvalue calculation, this can equivalently be accomplished by the solution of linear equations.

As indicated earlier the PageRank™ computation is equivalent to computing the principal eigenvector of the matrix $M = (1-\alpha)E/n + \alpha A$, as defined above. Power iteration is the most straightforward technique for computing the principal eigenvector of a matrix, and the technique commonly used to compute PageRank™.

In power iteration, an arbitrary vector is repeatedly multiplied with the given matrix until it probably converges to the principal eigenvector. The power iteration algorithm for PageRank™ computation is given below:

1. s← a random n×1 vector, typically $e_n$.
2. r←M×s.
3. If $\|r-s\| < \epsilon$, end. Wherein r is the PageRank™ vector.
4. s←r. Go to step 2.

Given the scale of the web, it is obvious that neither the vectors r, s nor the matrix M can be assumed to fit in the memory. So we have to use secondary memory techniques for implementing the matrix product of step 2 above and the error computation of step 3 of the power iteration. Note that although the matrix M is "dense", one need not explicitly materialize it. We can efficiently implement M×s using equation (8), which involves multiplication using the sparse matrix A.

Theoretically, the convergence of power iteration for any given matrix depends on the eigenvalue gap, the difference in the moduli of the largest two eigenvalues of the matrix. The larger the eigenvalue gap, the faster the convergence of power iteration. The eigenvalue gap for stochastic matrices also has a neat graph theoretic characterization in terms of expanders. Generally, a graph is an expander if the neighborhood of every subset of nodes of the graph is greater than some multiple of the size of the subset. Expanders have the desirable property that the power iteration converges quickly to the stationary state—in this case the PageRank™. Thus stochastic matrices that have a large eigenvalue gap correspond to expander graphs and vice versa. If the webgraph were an expander, power iteration would converge quickly.

The experiments described in this and the following sections were done using a snapshot of a webgraph crawled available at the Stanford WebBase repository. The webgraph contains around 25 million URLs and around 250 million links between these URLs. The largest strongly connected component (SCC) in this webgraph, with about 15 million pages, was used for all the experiments. The largest strongly connected component forms a significant fraction of the entire web. The SCC allows experimentation with all possible values of $\alpha$ including $\alpha=1$. In the following experiments, the vector s of the power iteration was initialized to a vector of all 1's.

A common measure of convergence for power iteration is the norm of the residual vector, which is the difference of two successive vectors generated by the power iteration. Consider two different norms, the $L_2$ norm $$\|v\|_2 = \left(\sum_i v_i^2\right)^{1/2}$$

and the $L_\infty$ norm $\|v\|_\infty = \max_i |v_i|$. Note that this error measure is not the same as the absolute error—the difference between the principal eigenvector (that we are trying to compute) and the current vector.

Figure 2:
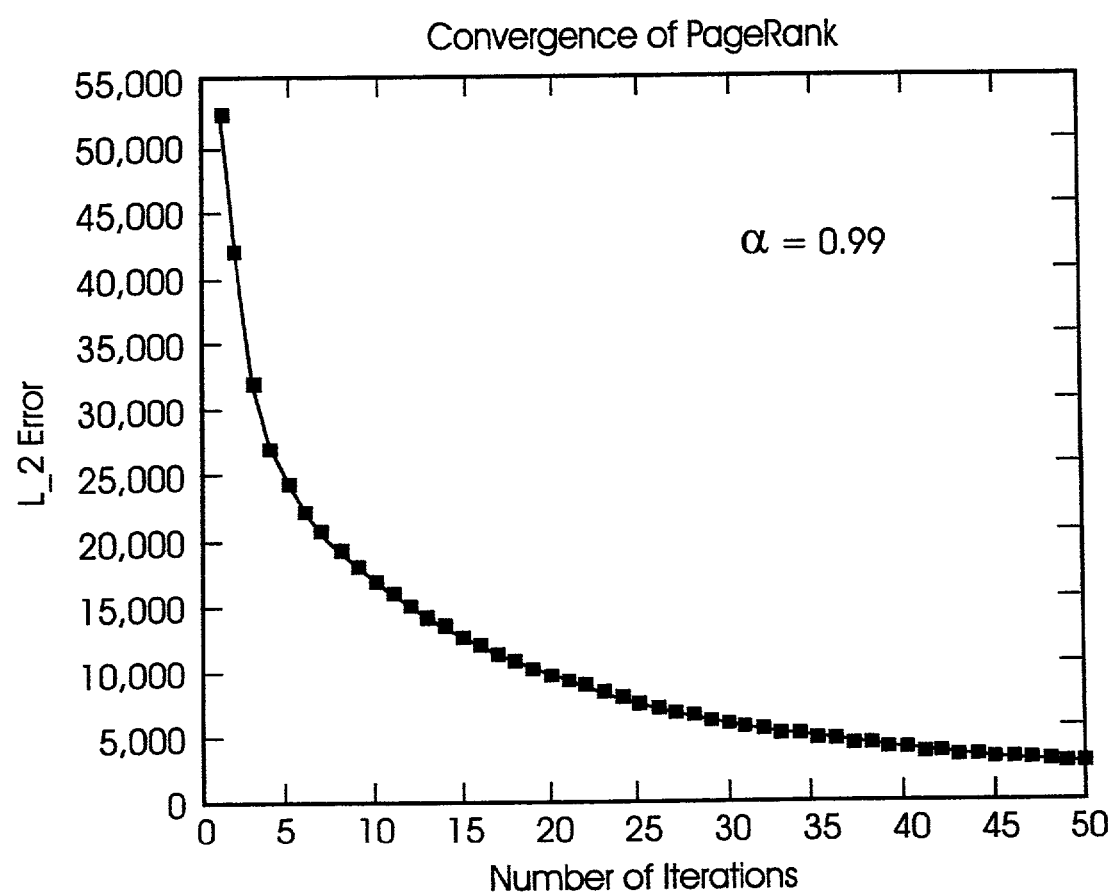
FIG. 2 is a graph illustrating a calculation of PageRank for power iteration with $\alpha = 0.99$.
Figure 3:
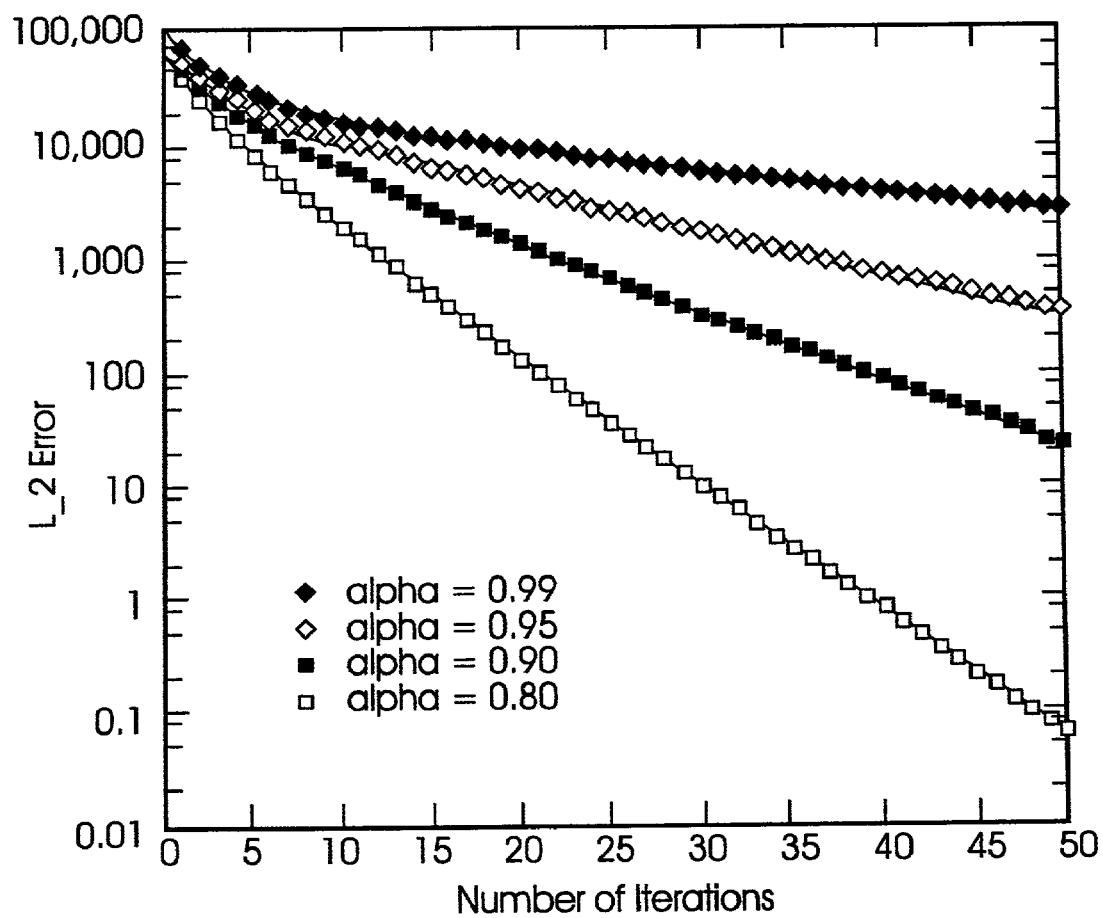
FIG. 3 is a graph illustrating the convergence of power iteration for different values of $\alpha$.

FIG. 2 shows the convergence of power iteration for $\alpha=0.99$ with respect to the $L_2$ norm. FIG. 3 shows the same in log scale as one of the 4 curves.

One can easily see that the convergence of power iteration is very slow (although it is rapid in the first few iterations). After about 50 iterations, the $L_2$ error is about 2800. Thus the average error per page (there are around 15 million pages) is approximately 0.5—unacceptably high as a fraction of the average PageRank™ per page, 1.0. Moreover, from the $L_\infty$ error we observe that there exist pages whose PageRank™ changes (within one iteration) by as much as 2000. This clearly suggests that the convergence of the power iteration is very slow for values of $\alpha$ close to 1. For the case a=1, the "ideal PageRank™", the power iteration practically stops converging after about 40 iterations. Thus we observe that the entire webgraph is not a good expander. This suggests that a plain power iteration is likely to be laborious for PageRank™ computation.

We consider next the effect of the parameter $\alpha$ on power iteration. FIG. 3 shows the log of the error of power iteration at each iteration for various values of $\alpha$.

FIG. 3 clearly shows that the parameter $\alpha$ plays an important role in the convergence of power iteration. The power iteration converges much faster for smaller values of $\alpha$. Intuitively, this is what we might expect from the definition of the expander graph. A small value of $\alpha$ implies that the random surfer would make more random jumps, the effect of which is to implicitly add more "edges" out of each subgraph (corresponding to the random jumps). However, using a smaller value of $\alpha$ has implications on the quality of the PageRank™ ranking scheme. Intuitively, by making random jumps more often we are using less information in the links. As an extreme case, consider what happens when $\alpha=0$.

Alternately, one can consider the effect of $\alpha$ as follows. In the "web surfer" interpretation of PageRank™, the surfer follows an outlink (links pointing out from) with probability $\alpha$, and jumps uniformly to a random location with probability $1-\alpha$. Thus, the expected number of steps until a uniform jump is $1/(1-\alpha)$. As alpha decreases, this value drops rapidly—with $\alpha=0.8$, for instance, the expected path length is 5. By elementary probability, the number of paths that will be significantly greater than this expectation is small. Therefore, for small $\alpha$, the actual PageRank™ model, far from approximating the principal eigenvector of matrix A, behaves like a random walk of five steps from the uniform distribution. Clearly this walk is straightforward to compute. We therefore expect the behavior of FIG. 3, in which a decrease in $\alpha$ has a significant and analytical impact on convergence.

The above experiments suggest a picture of connectivity in the SCC. The rapid convergence during early rounds starting from the uniform distribution suggests that most regions of the graph have good expansion and allow the system to move rapidly towards steady state. However the slow convergence of the process with values of $\alpha$ close to 1, after the first few rounds, suggests that there are regions of the SCC that cause the power iteration to "bog down."

Figure 4:
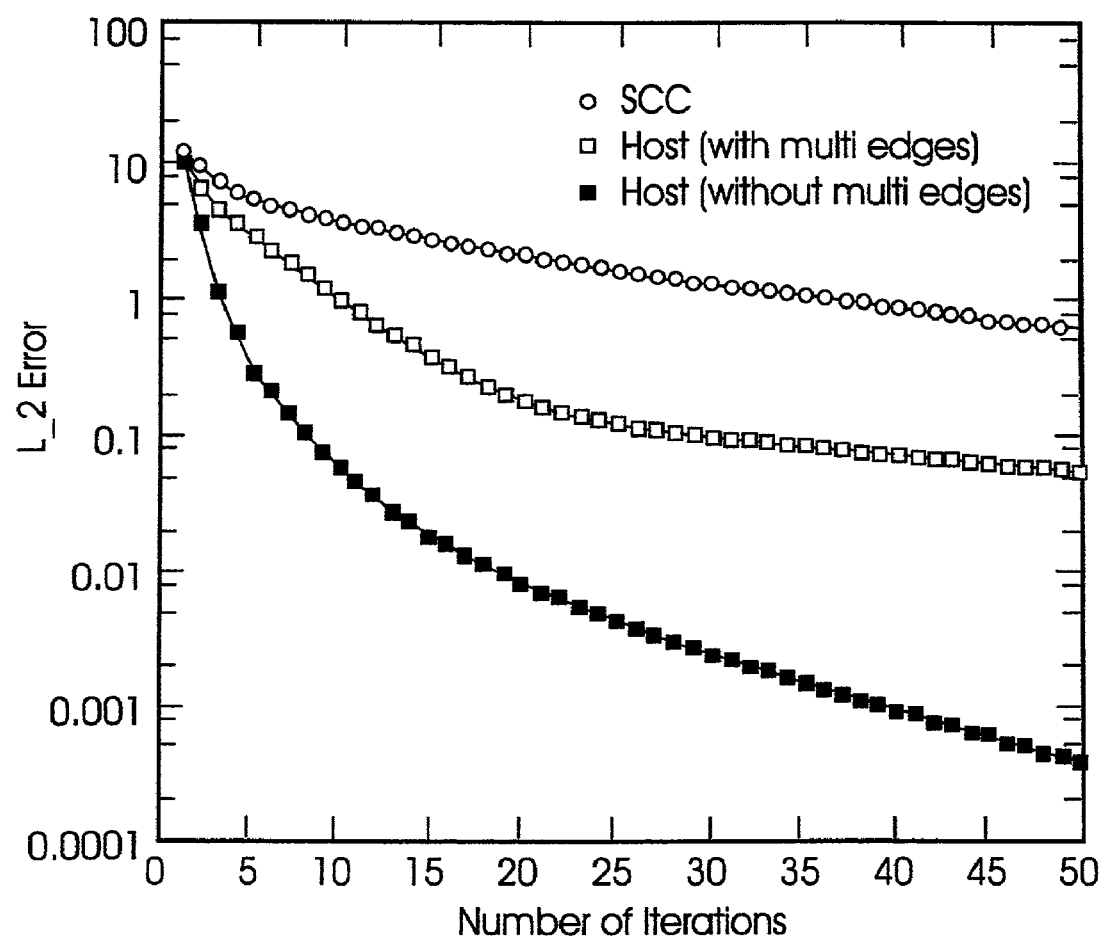
FIG. 4 is a graph illustrating a convergence of host graph vs. web graph.

The web graph can be partitioned into links inside web sites, and links across web sites, and then determine whether either set of links in particular is responsible for the slow convergence. To make this determination, consider the convergence of power iteration on the host graph, in which each vertex corresponds to an entire web site. Any edge between pages in different sites is represented as an edge between the corresponding site vertices in the host graph. Consider two variants: in the first allow multiple edges between sites if multiple pages on one site contained links to the same destination site. In the second, collapse all such hyperlinks into a single edge. FIG. 4 shows the convergence of power iteration for these two variants of the hostgraph against the convergence for the entire SCC. The error values are normalized for comparison purposes.

Note that the error measure in FIG. 4 is plotted in log scale. Clearly, in the domain of interest the error rates are orders of magnitude smaller in the host graph than in the SCC. Furthermore, the analytical computation of the second eigenvalue of the host graph, is 0.9896. Thus, the eigenvalue gap is larger than 1%, implying rapid convergence. On the other hand, the eigenvalue gap of the SCC was too small to complete its computation analytically, as expected from the extremely slow convergence rates of power iteration after the first few rounds.

Thus, connectivity between web sites is strong and robust. In fact, because expander graphs have logarithmic diameter, a surfer jumping from site to site could arrive at any site of interest within few steps. However, by shifting from the granularity of the host graph back to the granularity of the web graph itself, the complex structure within individual sites causes the surfer to become "stuck" within a local region.

Certainly, the majority of web sites do not contain such "surfer traps," so the remaining question is to identify particular sites with slow convergence, and deal with them using special-purpose techniques.

While the conventional method of computing page rank has involved finding the eigenvector specified by equation (9), consider solving the set of equations (8), which can be written more conventionally as:

$$(I - \alpha A)\chi = (1-\alpha)e \quad (10)$$

For very large sparse matrices there are a large number of iterative solution methods some of which might converge more quickly than the power method for eigenvectors. We have experimented with two iterative methods, and rather unsystematically with a third, comparing the convergence with the power method for equation (9). Our first experiment used the simple Jacobi iteration for solving equation (10), where denoting the rank vector at each iteration k by $\chi^{(k)}$ we compute:

$$\chi_i^{(k+1)} = (1-\alpha) + \alpha \sum_{(j,i) \in E} a_{ij} \chi_j^{(k)} \forall\, i \quad (11)$$

Figure 5:
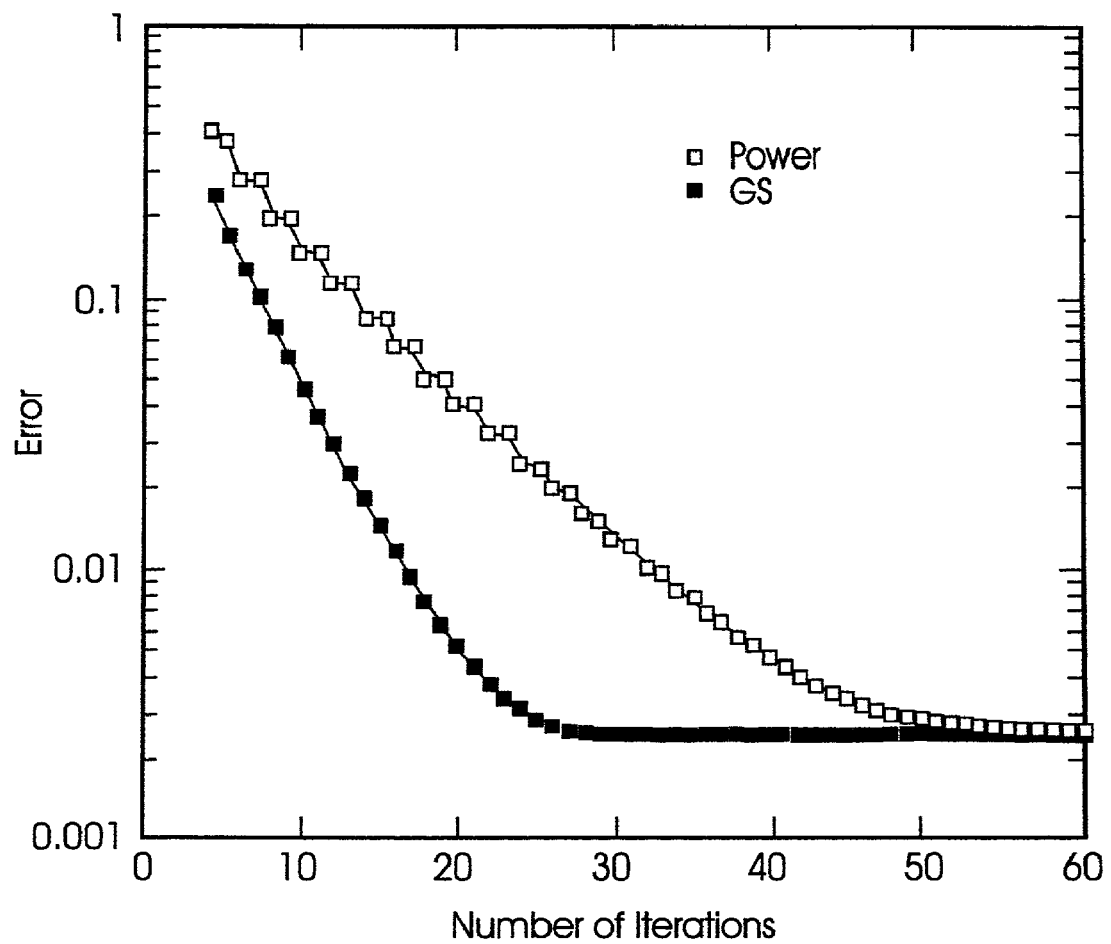
FIG. 5 is a graph illustrating logarithmic convergence of PageRank™ for power iteration and Gauss-Seidel with α=0.9.

Note that this is very little different from the power iteration step $$\chi_i^{(k+1)} = \frac{(1-\alpha)}{n} \sum_{i=1}^{n} \chi_j^{(k)} + \alpha \sum_{(j,i) \in E'} a_{ij} \chi_j^{(k)} \forall\, i \quad (12)$$

and indeed when starting both processes with the initial iterate $\chi^{(0)} = e$ (all 1's), then the first step will be identical. Since the matrix is (column) stochastic then this should continue in subsequent iterations as $\Sigma_i \chi_i^{(k)}$ will remain constant, ignoring rounding error, and we observe this to be the case in practice. However, embodiments of the present invention are not restricted to using the Jacobi iteration. The next obvious step is to use the Gauss-Seidel iteration:

$$\chi_i^{(k+1)} = (1-\alpha) + \alpha \sum_{j<i} a_{ij} \chi_j^{(k+1)} + \alpha \sum_{j>i} a_{ij} \chi_j^{(k)} \forall\, i \quad (13)$$

which uses the most recent values $$\chi_j^{(k+1)}$$

wherever possible. To illustrate the advantage of this method a plot of the convergence of the two methods using the sample 15 million node SCC of the previous sections is shown in FIG. 5. The eigenvector (for $\alpha=0.9$) is computed using the ARPACK software to full single precision accuracy—where the eigenvector is normalized so that $\|\chi\|_2 = 1$. Running Power Iteration and Gauss-Seidel methods, at each $\chi^{(k)}$ step computing the deviation of the current iterate $\chi^{(k)}$ from the ARPACK solution $\chi$, by normalizing $\chi^{(k)}$ so that $\|\chi^{(k)}\|_2 = 1$ and then evaluating $\|\chi^{(k)} - \chi\|_2$. The results are shown in FIG. 5.

The Gauss-Seidel method clearly converges much faster than the Power or Jacobi methods. The "Successive Over-Relaxation" (SOR) method, uses a relaxation parameter $\omega$ and iterates:

$$\chi_i^{(k+1)} = \omega\left\{(1-\alpha) + \alpha \sum_{j<i} a_{ij} \chi_j^{(k+1)} + \alpha \sum_{j>1} a_{ij} \chi_j^{(k)}\right\} + (1-\omega)\chi_i^{(k)} \forall\, i \quad (14)$$

Values of $\omega$ greater than 1 degraded convergence quite significantly, and values less than 1 (e.g. 0.9 and 0.8) produced minor degredations. Without more sophisticated analysis, it appears that SOR has little to offer over Gauss-Seidel in this application. Other iterative methods for solving large sparse systems of linear equations—including, for example, conjugate gradient or Lanczos methods are available.

The idea of equation-solving for PageRank appears to have significant computational advantages, and few disadvantages, when considered in isolation.

Figure 6:
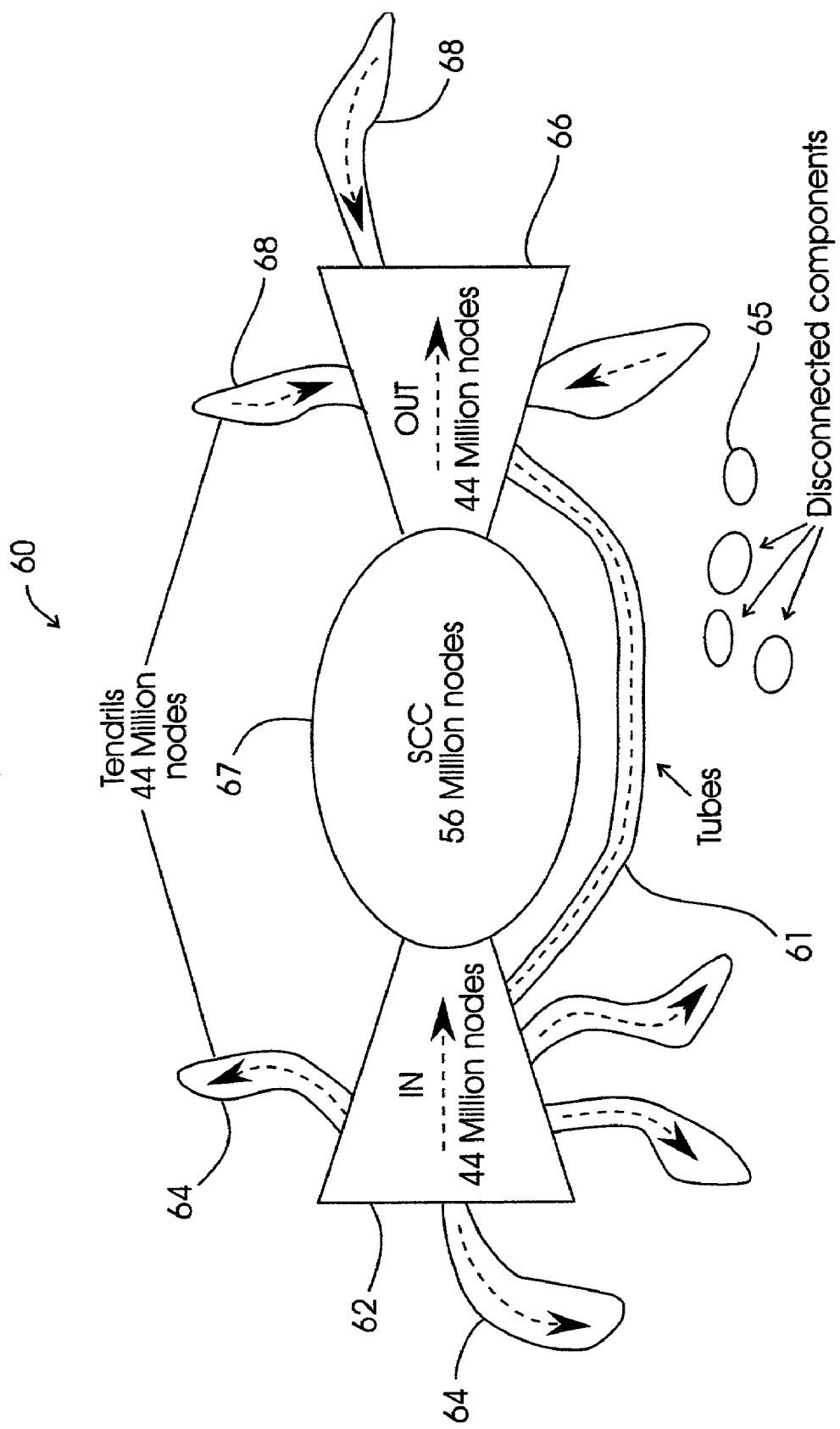
FIG. 6 is an illustration of the "Bow Tie" structure of the web.

Considering the large-scale structure of the web, the arguments for using an equation-solving approach become even stronger. As is now well known, the graph structure of the web may be described by the "Bow Tie" as shown in FIG. 6. As illustrated in FIG. 6, the Bow Tie web structure 60 generally comprises input segments 62 and output segments 66. The input 62 and output 66 segments are connected to the strongly connected component 67. Input nodes 64 are coupled to the input segment 62 and output nodes 68 are connected to the output segment 66. An interconnecting node 61 directly couples the input segment 62 and the output segment 66.

Figure 7:
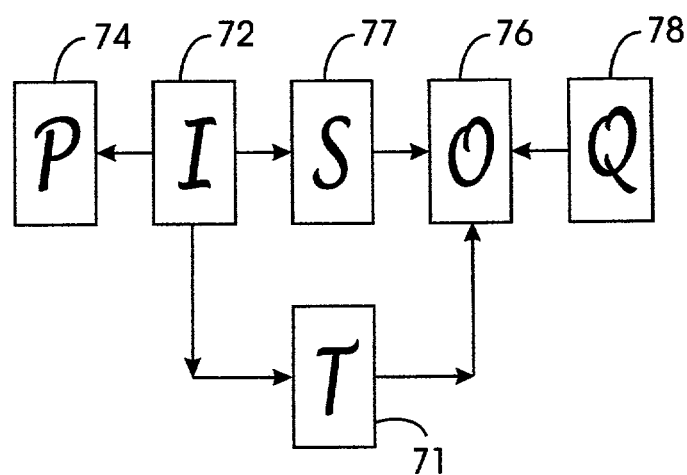
FIG. 7 is a block diagram of an illustration of the connectivity of the web.

Ignoring the disconnected components 65, which can be dealt with separately, this corresponds to an aggregated graph structure shown in FIG. 7.

Referring to FIGS. 6 and 7, the I 72, S 77, O 76 represent the "in 62", "strongly connected 67", and "out 66" segments of the web. P 74, Q 78, and T 71 represent the "in tendril 64", "out tendril 68" and "tube 61" nodes. This structure immediately induces (under symmetric permutation) a structure on the matrix A:

$$A = \begin{pmatrix} P & & & & A_{PI} & \\ & O & A_{OS} & A_{OT} & & A_{OQ} \\ & & S & & A_{SI} & \\ & & & T & A_{TI} & \\ & & & & I & \\ & & & & & Q \end{pmatrix} \quad (15)$$

(with I not to be confused with the unit matrix). This structure has obvious possibilities for parallel processing, whether we seek an eigenvector by the power method or solve a system of equations, with submatrices being assigned to processors and passing subinatrix-vector multiples to build up a complete matrix-vector product for, e.g., power iterations or Jacobi. The situation becomes slightly more complicated, but still straightforward for Gauss-Seidel.

When an equation solving method is used we have an opportunity to use not only parallelism, but quite independently, to use partitioning. While the eigenvector calculation must be rescued by the notional random jumps, which produce a fully dense matrix in equation (9) we are free to fully exploit the structure in equation (15). Conformably partitioning $\chi$ with the matrix so that $$\chi^T = (\chi_P^T, \chi_O^T, \chi_S^T, \chi_T^T, \chi_I^T, \chi_Q^T)$$

equation (10) can be solved by solving a sequence of smaller problems:

$$(I-\alpha Q)\chi_Q = (1-\alpha)e \quad (16)$$

$$(I-\alpha I)\chi_I = (1-\alpha)e \quad (17)$$

in either order, or in parallel, followed by:

$$(I-\alpha S)\chi_S = (1-\alpha)e + \alpha A_{SI}\chi_I \quad (18)$$

$$(I-\alpha T)\chi_T = (1-\alpha)e + \alpha A_{TI}\chi_I \quad (19)$$

again, possibly in parallel, followed by solution of:

$$(I-\alpha O)\chi_O = (1-\alpha)e + \alpha A_{OS}\chi_S + \alpha A_{OT}\chi_T + \alpha A_{OQ}\chi_Q \quad (20)$$

Note that we may solve:

$$(I-\alpha P)\chi_P = (1-\alpha)e + \alpha A_{PI}\chi_I \quad (21)$$

at any time after $\chi_I$ has been computed—possibly in parallel with any of equations (18)–(20). There are obviously further minor opportunities for exploiting parallelism when computing the matrix-vector products $A_{OS}\chi_S$, etc.

The real benefit from the equation solving approach is not so much the parallelism as the partitioning into smaller sub-problems of equations (16)–(21). Generally speaking, we expect the solution of the sub-problems by iterative methods to take fewer iterations individually than is required for the huge matrix A, leading to less arithmetic—especially since the off-diagonal matrix-vector products ($A_{OS}\chi_S$, etc.) need be performed only once, rather than at every iteration. The other payoff, perhaps the payoff, is in reduced I/O.

The enormous size of A makes it impractical to solve in main memory on standard work stations. Therefore the matrix (and perhaps even the vectors $\chi^{(k)}$) must be buffered into memory. For power iterations, the entire matrix A must be buffered every iteration, and we have seen that convergence of this method is at best inferior to Gauss-Seidel. When we solve the sequence of sets of equations (16)–(21) some of the matrices may even be able to fit in memory, but even if not, the total amount of buffering (I/O) required is considerably reduced, which should have even more impact on elapsed solution time than the reduced amount of arithmetic; an important consideration if we wish to keep our PageRank™ data as current as possible for a rapidly expanding web.

Figure 8:
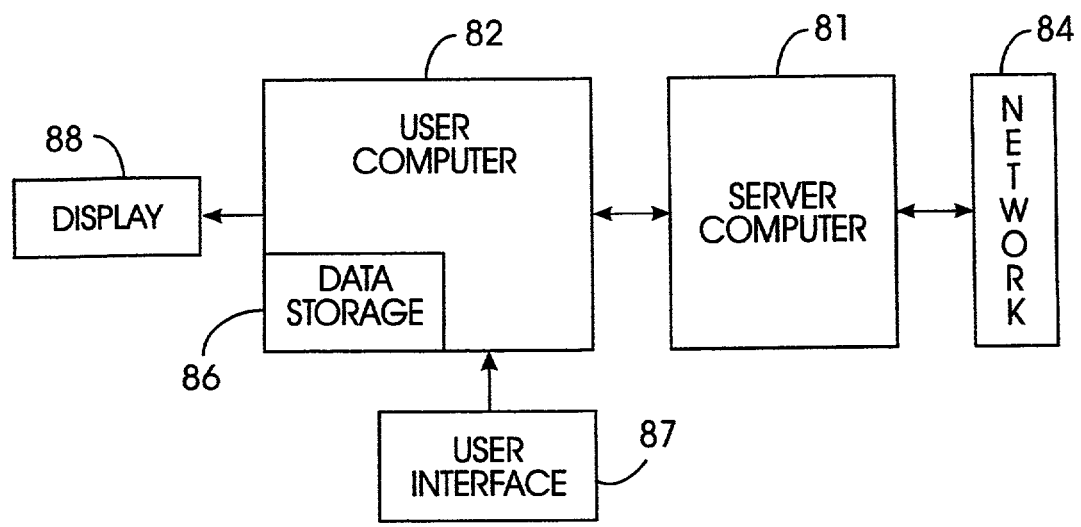
FIG. 8 is a block diagram of one embodiment of an apparatus that can be used to practice the present invention.

The present invention may also include software and computer programs incorporating the process steps and instructions described above that are executed in different computers. In the preferred embodiment, the computers are connected to the Internet. FIG. 8 is a block diagram of one embodiment of a typical apparatus incorporating features of the present invention that may be used to practice the present invention. As shown, a computer system 81 may be linked to another computer system 82, such that the computers 81 and 82 are capable of sending information to each other and receiving information from each other. In one embodiment, computer system 80 could include a server computer 81 adapted to communicate with a network 84, such as for example, the Internet. Computer systems 81 and 82 can be linked together in any conventional manner including a modem, hard wire connection, or fiber optic link. Generally, information can be made available to both computer systems 81 and 82 using a communication protocol typically sent over a communication channel or through a dial-up connection on ISDN line. Computers 81 and 82 are generally adapted to utilize program storage devices embodying machine readable program source code which is adapted to cause the computers 81 and 82 to perform the method steps of the present invention. The program storage devices incorporating features of the present invention may be devised, made and used as a component of a machine utilizing optics, magnetic properties and/or electronics to perform the procedures and methods of the present invention. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 81 and 82 may also include a microprocessor for executing stored programs. Computer 81 may include a data storage device 86 on its program storage device for the storage of information and data. The computer program or software incorporating the processes and method steps incorporating features of the present invention may be stored in one or more computers 81 and 82 on an otherwise conventional program storage device. In one embodiment, computers 81 and 82 may include a user interface 87, and a display interface 88 from which features of the present invention can be accessed. The user interface 87 and the display interface 88 can be adapted to allow the input of queries and commands to the system, as well as present the results of the commands and queries.

The present invention is directed to web-scale computation of the PageRank static ranking function, incorporating both algorithmic techniques drawn from numerical analysis, and particular structure in the problem instance drawn from web characterization. Algorithmically, the features of the present invention approach the problem using equation solving rather than eigensystem techniques. This approach yields significant performance improvements over power iteration. Further, it allows exploitation of the well-known "bow tie" characterization of the web to partition the problem into independent subproblems. Finally, the characterization of the expansion properties of the graph as a whole versus the graph of inter-site connectivity explains the poor performance of power iteration.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for determining a ranking of each page in a network of linked pages, some pages being linked to other pages and at least some pages being linking pages or a combination thereof, the method comprising;

obtaining the linked pages from a web-based structure comprising a plurality of input segments I with input nodes P, a plurality of output segments O with output nodes Q, a plurality of strongly connected segments S connected to both the input segments, and output segments, and nodes T interconnecting the input and output segments;

forming a matrix structure defined by the input segments I, the input nodes P, the output segments O, the output nodes Q, the strongly connected segments S, and the nodes T, such that the input segments I, the input nodes P, the output segments O, the output nodes Q, the strongly connected segments S, and the nodes T are arranged along the main diagonal of the matrix structure; and partitioning the matrix structure in order to solve for the rank of each page via a sequence of smaller systems of equations.

2. The method of claim 1 wherein a subset of the sequence of smaller systems of equations are solved in order.

3. The method of claim 1 wherein a subset of the sequence of smaller systems of equations are solved in parallel.

4. The method of claim 1 wherein one of the sequence of smaller systems of equations is resolved after a rank vector is computed.

* * * * *